UNITED STATES PATENT OFFICE.

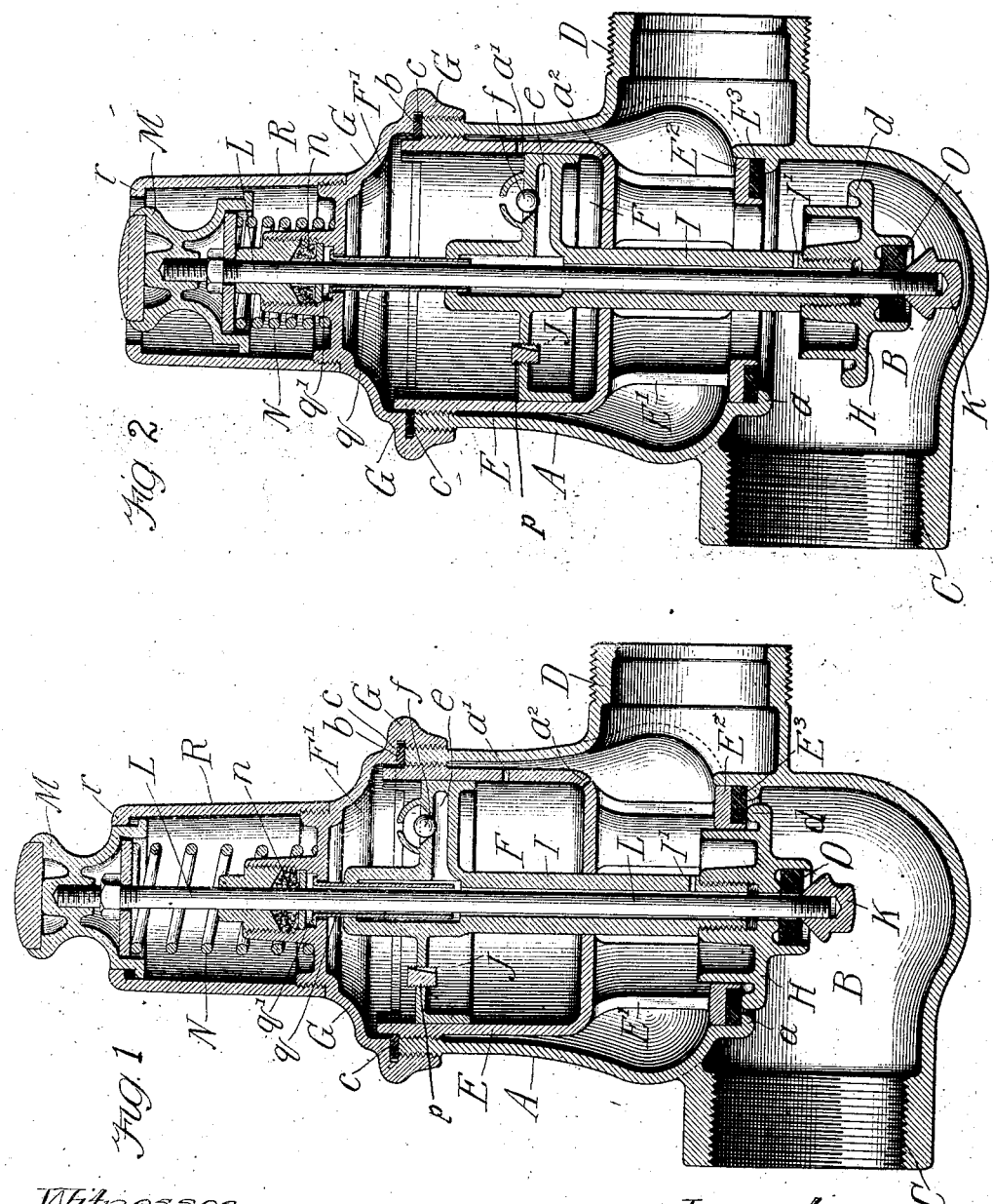

EARL G. WATROUS, OF CHICAGO, ILLINOIS.

FLUSHING-VALVE.

1,162,957.  Specification of Letters Patent.  Patented Dec. 7, 1915.

Application filed September 12, 1910. Serial No. 581,609.

*To all whom it may concern:*

Be it known that I, EARL G. WATROUS, a citizen of the United States, residing at Chicago, in the county of Cook and State of Illinois, have invented certain new and useful Improvements in Flushing-Valves for Water-Closets, of which the following is a description, reference being had to the accompanying drawing, forming a part of this specification.

My invention relates to that class of flushing-valves commonly known as slow-closing valves, which are quickly opened by or as the result of a manual operation and which automatically close upon release of the manually moved part, the closing movement of the valve being obstructed and retarded by a confined body of water whose escape through a small orifice or by-pass regulates and controls such closing movement.

It has for its object the improved construction and increased efficiency of valves of this class, and its novelty will be hereinafter set forth and particularly pointed out in my claims.

In the accompanying drawings Figure 1 is a vertical section of my slow-closing valve through the center thereof certain parts, however, being shown in elevation; Fig. 2 is a similar view with the valve fully opened.

The valve structure comprises an outer shell or casing A having an upright or vertical portion approximately circular in cross section, whose lower end is formed into a right-angular bend inclosing a chamber B and terminating in a pipe-connection C for the water-supply pipe, and provided upon its opposite side with a second pipe-connection D for the discharge pipe leading to the closet with which the valve is connected.

The upper end of the cylindrical body of the casing A is screw-threaded both internally and externally, its internal threads being engaged by the screw-threaded upper end of an internal casing E, the interior of whose upper portion constitutes a chamber for the piston hereinafter described, and whose lower portion is composed of a cage-like structure E' which carries at its lower end an annular casting E², the periphery of which fits snugly within the contracted lower end of the upright portion of the casing A, and the opening through which constitutes the main valve opening or water passage of the valve structure, as hereafter described. The ring casting E² is provided in its underside with an annular recess in which fits a leather ring E³, whose inner portion constitutes the valve seat, while its outer portion rests upon an inwardly projecting annular shoulder $a$ formed upon the inner surface of the casing A.

In assembling the parts the casing E with its integral depending cage E' and ring-casting E² is inserted into the open upper end of the outer casing A until the external threads upon the upper end of the casing E engage the internal threads in the upper end of the casing A, and the former is thereupon screwed on into the casing A until the leather ring E³ in its lower end is firmly seated against the annular shoulder $a$, after which the parts are firmly secured in position by means of a screw cap G which is screwed upon the upper end of the casing A and is provided with an internal flange or annular shoulder $b$ which projects inward over the upper end of the casing A and an annular shoulder formed upon the outer surface of the casing E at the upper end of its externally threaded portion. A packing ring $c$ confined between the annular flange of the cap-piece G and the upper end of the casing A and the annular shoulder on the casing E serves to effect a tight joint between the parts.

The main valve H, which coöperates with the valve-seat E³, is carried by the lower end of the tubular stem I of the piston J which fits and travels in the chamber F formed in the upper end of the casing E, and said main valve consists of a cylindrical body portion of cup shape, which passes through and approximately fits the opening in the ring-casting E², and an outwardly projecting and upturned annular flange portion $d$ which constitutes the seating surface of the valve and seats against the underside of the leather valve seat E³ when the valve is in its upper and closed position.

Combined with the main valve H is a supplemental or relief valve K carried by the lower end of a rod L which extends upwardly through the tubular piston stem I and through the piston J and the parts above it, and has secured to its extreme upper end a push button M by means of which it may be depressed, against the resistance of a spring N, to unseat the valve K, the latter consisting of a nut screwed upon the lower end of the rod L and having a cone-shaped upper surface which seats against a leather disk O located in a circular recess or seat formed to receive it in the underside of the main valve H. The spring N referred to above is confined between the push button M and the top of the valve casing and surrounds the packing gland $n$ about the valve rod L. A sleeve or housing R screwed to the top of the valve casing surrounds the spring and by means of an inwardly turned flange $r$ limits the upward movement of the push button M. The interior of the tubular piston stem I communicates at its upper end with a passage or chamber $e$ formed in the body of the piston J, and this passage or chamber communicates by a port controlled by a check valve $f$ with the space or chamber F' above the piston J and within the screw cap G constituting the top of the main casing. Ports $a'$, $a^2$ formed in the shell or wall of the chamber F connect its interior with the interior of the surrounding casing A, to afford ingress and egress of air and water in the operation of the valve. The tubular piston stem I is extended above the piston and somewhat enlarged in its interior diameter and the sleeve $q$ extends within the enlarged bore of the valve stem and at its upper end extends through the cap G and is provided with an upwardly extending flange $q'$ which rests upon and is secured to the cap in such a manner as to render the joint water tight. Obviously the sleeve will be immovable with relation to the cap but the piston and associated parts will slide with reference thereto. The hollow stem I is also provided at its lower end with a perforation I' for a purpose which will appear.

The operation of my improved valve, under the foregoing construction and arrangement of parts, is as follows: All parts of the valve casing are normally free from water except the chamber B in the bottom of the valve casing which is normally filled with water under pressure from the supply connection C, but the main valve H is held to its seat by such pressure and by the spring N and the water therefore cannot pass through the valve to the discharge connection D. Upon depressing the push button M at the top of the valve, and thereby unseating the relief valve K, water under pressure passes from the chamber B upward through the tubular piston stem I and passage $e$ in the piston to the port controlled by the check valve $f$, and thence into the chamber F' above the piston. The area of the upper side of the piston J being larger than that of the main valve H, the preponderating pressure produced by this admission of the water to the chamber F' above the piston will force the latter downward, the air below the piston escaping in the meantime through openings $a'$, $a^2$. The main valve is thereby carried away from its seat, and its cylindrical body portion out of and below the opening therein, to permit free passage of water from the inlet connection and chamber B through the valve opening to the outlet connection D. This condition of things will continue so long as the relief valve K is held depressed and unseated by pressure upon the push-button M, but upon relieving this pressure on the button the spring N will instantly reseat the valve K and cut off the further admission of water under pressure to the chamber F' above the piston. The spring N, which has been compressed to a considerable extent at the opening movement of the valve, will also exert an upward pull or pressure upon the main valve H, through the medium of the rod L and relief valve K, and tend to lift said main valve to its seat. Said valve can rise no faster, however, than the piston J with which it is connected, and the piston J can rise only as fast as the water in the chamber F' above it can escape. The check valve $f$ prevents its escape through the port by which it entered the chamber, but it may escape through the port $a'$ until that is covered by the ascent of the piston and then slowly around the piston J if the latter is fitted loosely in its chamber F, or an adjustable by-pass $p$ through the piston itself may be provided for the purpose, the two arrangements being familiar alternatives in valves of this character. As soon as the piston and main valve have been lifted high enough, under the action of the spring, for the upper end of the cylindrical body of the valve H to enter the opening in the valve-seat the closing movement of the valve will be accelerated by the water pressure beneath it and the valve be quickly forced to its seat.

The ports $a'$, $a^2$ in the wall of the chamber F permit the free escape of air from said chamber at the downward movement of the piston during the opening of the valve, so that the piston may freely descend under the pressure above it without obstruction or resistance; while the provision of the otherwise closed chamber F beneath the piston prevents the free access of water under pressure to its underside, with consequent obstruction to the opening movement of the valve, as in the case of many prior valves of this general character. More or less water may pass into the chamber F through the ports $a'$, $a^2$ while the main valve remains open and the flushing action is continuing, but it is not admitted to said chamber quickly enough to materially obstruct the opening movement of the valve; and any water that may pass into the chamber at the opening movement of the valve may subsequently escape from it through the port or ports in the bottom of the chamber. The ports $a'$, $a^2$ are not essential to the operation of my improved valve, or to the attainment of the advantages of the approximately closed chamber F beneath the piston J, since their places may be supplied by a sufficiently loose fit of the piston stem I in the central opening in the bottom of said chamber, but I prefer to provide the ports for the purpose. Nor is the check valve f essential to the operation of my improved valve, for with the valve K closed by the spring and the superior pressure of the water behind it, water entering the passage in the hollow valve stem can only escape through the opening I'. And the latter opening may also be omitted if desired but it serves a useful function in connection with the sleeve q. Without the latter element the full pressure of the water in the chamber F' might penetrate the packing in the gland N especially if the latter were not in the best possible condition, and in fact for the instant when the valve K is open this packing is necessarily exposed to the full pressure through the interior of the sleeve q but this instantaneous exposure is not sufficient to cause the water to work through the packing, and when the valve K is closed a condition of little or no pressure exists within the hollow stem due to the presence of the opening I'. Therefore, any water forced into the hollow stem around the sleeve q flows off and does not penetrate the packing. It is especially to be observed that since the outlet is connected to the bowl to be flushed at a point below the level of the valve the piston and cylinder are normally free from water and therefore not subject to the accumulation of slime or accretions of rust as is the case with the valves heretofore employed in which the piston and cylinder are normally submerged.

What I claim is:

1. In a device of the class described, a valve casing having a valve seat and inlet and outlet ports, a main valve on the inlet side of the seat seating upwardly thereagainst, a cylinder arranged above the valve seat on the outlet side thereof having a lower end closed against a rush of water but communicating by small drain openings with the outlet side of the casing, a by-pass between the upper and lower ends of the cylinder, a piston in the cylinder connected to the main valve, a passage from the inlet side of the valve seat to the upper end of the cylinder, and a valve controlling the said passage.

2. In a slow closing valve, the combination of a casing having a vertical outer shell provided with inlet and outlet openings, a vertical internal shell comprising at its upper end a cylinder closed at its lower end except for drain openings adjacent said outlet opening and at its lower part extending below said cylinder, a cage having at its lower end a partition and a valve seat, a main valve seating upwardly on said valve seat, a piston in said cylinder connected to said valve, a bypass permitting restricted communication from one side of said piston to the other, a passage through said valve, connection and piston to the upper end of the cylinder, an auxiliary valve controlling said passage, and a cap closing the top of the cylinder.

3. In a device of the class described, a valve casing having inlet and outlet passages and provided with a cylinder having a closed top, a main valve controlling said inlet and outlet passages, a piston in said cylinder, said piston having a hollow stem, a valve controlling the flow of water through said hollow stem and having a valve stem extending through said hollow stem and through the top of the casing; said hollow stem having a sliding connection with the cylinder preventing flow of water into the top of the cylinder, a lateral passage in said piston governing communication between said hollow stem and said cylinder top, and a check valve in said lateral passage.

4. In a device of the class described, the combination of a casing having inlet and outlet openings and a valve seat, a cylinder mounted above the valve seat and coaxial therewith, a main valve coöperating with the valve seat, a piston in the cylinder having a hollow stem which is secured to the main valve and affords communication through said valve to the cylinder above the piston, a check valve governing communication through such hollow stem, a bypass permitting restricted communication from one side of said piston to the other, a supplemental valve, a valve seat therefor on the main valve, and a valve stem for operating such supplemental valve extending through the hollow stem, the hollow stem of the piston having a small opening connecting the bore of said stem with the interior of the casing adjacent the outlet opening thereof.

5. In a device of the class described, a valve casing having a valve seat and inlet and outlet ports, a main valve on the inlet side of the seat and seating upwardly thereagainst, a cylinder arranged above the valve seat and on the outlet side thereof, a piston in the cylinder connected to the main valve, there being a passage through the main valve, piston and connection for the flow of water, a valve controlling the passage having a valve stem extending through the passage, a cap closing the upper end of the cylinder, through which cap the valve rod passes and beyond which it is provided with an operating handle, an offset passage in the piston communicating through a valve seat with the cylinder at the upper side of the piston, and a valve f in said seat for controlling the flow of water.

6. In a slow-closing valve, the combination of a casing having a valve seat, a main valve coöperating therewith, inflow and outflow ports in the casing, a cylinder, having the lower end closed except for passages of limited area, mounted above the valve and above the level of the outflow passage, a piston in the cylinder, a passage for admitting water to the upper end of the cylinder, a valve controlling such passage, and a by-pass for permitting the slow outflow of water from the upper to the lower side of the piston.

7. In a device of the class described, the combination of a casing having a valve seat, a cylinder mounted above the valve seat and coaxial therewith, a main valve coöperating with the valve seat, a piston in the cylinder connected to the main valve for operating the same, a hollow stem forming said connection, a cap G closing the upper end of the cylinder, a stuffing box on such cap, a supplemental manually-controlled valve, a valve seat therefor on the main valve, a valve stem for operating such supplemental valve extending through the hollow stem and stuffing box and provided with operating means outside the casing, a sleeve surrounding the valve stem secured at its upper end to the cap G and extending within the hollow of the stem connecting the piston and main valve, and a by-pass for permitting escape of water from the upper end of the cylinder.

8. In a device of the class described, the combination of a casing having a valve seat, a cylinder mounted above the valve seat and coaxial therewith, a main valve coöperating with the valve seat, a piston in the cylinder connected to the main valve for operating the same, a hollow stem forming said connection, a cap G closing the upper end of the cylinder, a stuffing box on such cap, a supplemental manually-controlled valve, a valve seat therefor on the main valve, a valve stem for operating such supplemental valve extending through the hollow stem and stuffing box and provided with operating means outside the casing, a sleeve surrounding the valve stem secured at its upper end to the cap G and extending within the hollow of the stem connecting the piston and main valve, an opening I' from the bore of the hollow stem to the interior of the casing, and a by-pass for permitting escape of water from the upper end of the cylinder.

9. In a device of the class described, a valve casing having inlet and outlet passages and a valve seat, a main valve, a cylinder on the outlet side of said valve having a closed top, a piston in the cylinder having a hollow stem connected to said main valve and forming a passage for the flow of water, said passage having an opening into said cylinder, a supplemental valve seating on said main valve for governing said passage, a valve stem for operating said supplemental valve extending through said hollow stem and through the top of the cylinder, a stuffing box surrounding said valve stem, and a hollow sleeve secured at its upper end to the casing and having a sliding engagement with the upper end of the hollow stem.

10. In a device of the class described, a valve casing having inlet and outlet passages and provided with a cylinder having a closed top, a main valve controlling said inlet and outlet passages, a piston in said cylinder, said piston having a hollow stem opening into the cylinder for the flow of water thereinto, a valve controlling the flow of water through said hollow stem and having a valve stem extending through said hollow stem and through the top of the casing, and a hollow sleeve surrounding said valve stem secured at its upper end to the casing and having a sliding engagement with the uper end of said hollow stem.

11. In a slow closing valve, the combination of a casing having a valve seat, a main valve coöperating therewith, inflow and outflow ports in the casing, a cylinder, having its lower end closed except for passages of limited area, mounted above the valve, and above the level of the outflow passage, a piston in the cylinder, a passage for admitting water to the upper end of the cylinder, a check valve in said passage, a hand-operated valve also controlling such passage, and a by-pass for permitting the slow outflow of water from the upper to the lower side of the piston.

EARL G. WATROUS.

Witnesses:
ROBERT DOBBERMAN,
LOUIS B. ERWIN.